United States Patent Office 2,794,728
Patented June 4, 1957

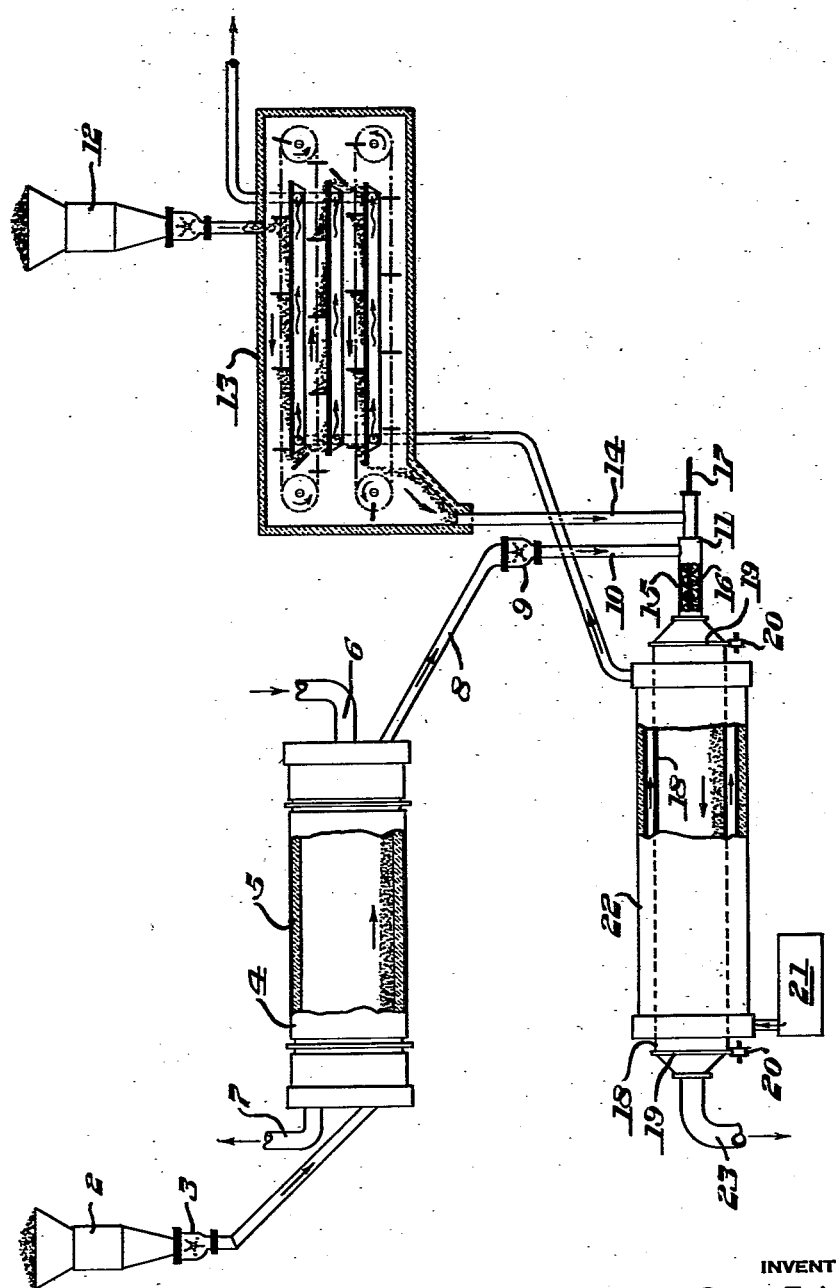
INVENTOR
CARL E. LESHER

2,794,728

PROCESS OF MAKING A FLOWABLE SOLID ORE-CARBON MASS

Carl E. Lesher, Ben Avon Heights, Pa., assignor to Lesher and Associates, Inc., Pittsburgh, Pa., a corporation of Pennsylvania Application May 14, 1953, Serial No. 355,085

5 Claims. (Cl. 75—4)

This invention relates to a process of making a flowable solid ore-carbon mass. It has to do with the impregnating or coating of fine particles of ores with carbon to make a product comprising discrete particles of ore and carbon adherently connected. Such product is adapted for various uses including metallurgical reduction in which the carbon components of the particles act as the reducing agent. When such product is employed in metallurgical reduction processes unprecedented results in efficiency and economy of operation are attained.

The speed of chemical and metallurgical reactions is related to the surface area available for reaction. Finely comminuted materials are more readily and completely reacted than coarse or large pieces which have much less surface area per unit of weight. Although that has long been recognized it has not heretofore been discovered how to take full advantage in metallurgical processes of unconsolidated, finely divided ores and reactants such as carbon. It has not been found feasible to smelt or reduce oxide ores in a state of fine pulverization. Powdered or finely granular material tends to pack into an impervious mass through which gases and heat do not easily pass.

Reduction metallurgy is largely concerned with the removal of oxygen from compounds containing oxygen and metal. Carbon is the most readily available and most common reducing agent. The most satisfactory and economical method of effecting the reduction of oxides with carbon as a solid or as carbon monoxide gas has been by treating the oxides in a fixed bed reactor in the form of a shaft furnace commonly known as a blast furnace.

The material of the bed in a fixed bed reactor must be freely permeable to gas. This means that the material charged into the fixed bed reactor should be coarse. Various methods have been proposed for consolidating or increasing the size of ore particles such as briquetting, sintering, pelletizing, nodulizing or otherwise agglomerating the fines. But the very increase in particle size has defeated metallurgical efficiency through decreasing surface area per unit of weight.

I provide for forming the ore with carbon for reduction into a flowable mass of discrete solids so that the reduction of the ore may be effected in a fluid bed; thereby unprecedented results in metallurgical efficiency and operating economy are obtained. The fluid bed is made up of relatively fine particles through which a gas is forced upwardly at such a rate that the bed of solids expands and the solids boil and flow as in a boiling liquid. The rate of gas flow is controlled so that there is optimum mixing and contact between the gas and solids without excessive outflow of solids in the effluent gas stream. The great efficiency of the process is realized because of the high rate of reaction obtainable through use of relatively small particles of large surface area per unit of weight and optimum use of such large surface area for contact with the gas.

By my process I produce a product which comprises a flowable mass of fine descrete solids, the solids comprising particles respectively made up of ore and carbon adherently connected. The ore particles may to a large extent be coated with carbon. Preferably at least 90% by weight of the solids of the flowable mass have a mean dimension not substantially greater than ⅜". The content of the preponderance of the particles of the flowable mass of fine solids is 70 to 95% by weight ore, the remainder largely carbon.

I may produce a flowable mass of fine discrete solids largely made up of particles of carbonaceous material and particles of material which is predominantly ore adherently connected together by simultaneously agitating a mixture of finely divided coking carbonaceous material in solid form and finely divided material which is predominantly ore and heating the carbonaceous material until the carbonaceous material softens and becomes sticky, at which time the agitation of the mixture causes particles of the carbonaceous material and particles of the material which is predominantly ore to become adherently connected together as fine solids forming a flowable mass, and continuing the agitation of the mixture and the heating of the carbonaceous material until the carbonaceous material returns to solid form. I preferably employ in forming the mixture not substantially more than 25% by weight of finely divided coking carbonaceous material and not substantially less than 75% by weight of finely divided material which is predominantly ore. The mixture may comprise about 15-20% by weight finely ground coking coal and about 85-80% by weight material which is predominantly ore of about ¼" top size, or it may comprise about 25% by weight finely ground coking coal and about 75% by weight material which is predominantly ore of a size to pass through a 200 mesh screen. In general, the ratio of carbonaceous material to ore by weight should be not substantially greater than 1:3.

I have employed a coarse ore of which 96% was plus 20 mesh in a series of tests with from 19% to 26% coking coal. This gave a product containing 9% to 16% carbon, with approximately the same size range and distribution as the ore. I have, on the other hand, employed very fine sized ore concentrates, in which the ratio of coking coal to ore was 1 to 3.4. This gave a product of the following size and carbon analysis:

| Size Mesh | Ore Size, Percent | Product Size, Percent | Carbon, Percent |
| --- | --- | --- | --- |
| Plus 6 | 0.0 | 4.2 | 14.7 |
| 6 x 20 | 0.5 | 27.8 | 18.3 |
| 20 x 100 | 7.0 | 48.8 | 14.0 |
| −100 | 92.5 | 19.2 | 4.8 |

I preferably preheat finely divided coking carbonaceous material in solid form to a temperature approaching but below the softening temperature of the carbonaceous material, preheat finely divided material which is predominantly ore to a temperature above the softening temperature of the carbonaceous material, admix the preheated carbonaceous material and the preheated material which is predominantly ore, feed the mixture to an agitating zone wherein the mixture is agitated while the temperature of the carbonaceous material is increased until the carbonaceous material softens and becomes sticky, at which time the agitation of the mixture causes particles of the carbonaceous material and particles of the material which is predominantly ore to become adherently connected together as fine solids forming a flowable mass, and continue the agitation of the mixture and the heating of the carbonaceous material until the carbonaceous material returns to solid form. I normally preheat the finely divided coking carbonaceous material to a temperature of the order of 400–700° F. and preheat the finely divided material which is predominantly ore to a temperature of the order of at least 900° F. The carbonaceous material while in the agitating zone may be heated entirely by the sensible heat in the material which is predominantly ore although some external heat is ordinarily applied.

The time during which the preheated carbonaceous material and the preheated material which is predominantly ore are admixed prior to entry to the agitating zone is preferably limited so as not to exceed about one minute. The mixture is preferably removed from the agitating zone after a period not substantially greater than about ten minutes.

Other details, objects and advantages of the invention will become apparent as the following description of certain present preferred methods of practicing the same proceeds.

In the accompanying drawing I have shown diagrammatically apparatus which may be employed for carrying out my method.

Referring first to the product produced, in its preferred form it consists largely or substantially entirely of small sized particles of mineral ore impregnated or coated with the carbon of coke from coal. For the most part the larger particles of ore retain their original form and shape and are coated with low temperature coke. This is ordinarily true of particles of such size that they do not pass through an 8 mesh screen. Smaller particles may to some extent be agglomerated or bonded together by the cementing action of the coke into pieces having a mean dimension not substantially greater than ⅜″.

The carbonaceous material which I employ should be a solid which can be pulverized at room temperature and which softens and becomes sticky when it is heated sufficiently to give off volatile matter and becomes solid when it is further heated and devolatilized. Such material is comprehended by the term "coking carbonaceous material" in my claims. The carbonaceous materials most widely known to possess the properties above mentioned are coking coal, coal tar pitch and petroleum asphalt. The temperatures at which the changes in state take place in treatment of the different carbonaceous materials vary.

The particles of ore and the particles of coal should be predominantly not substantially greater than ⅜″ in size. I like to use ore and coal ground so that practically all of the particles are less than ¼″ in size. In some cases the particles should be of such size that the great preponderance of them will pass through an 8 mesh screen. However, the precise particle size is not a limitation on the process of manufacture but of the advantages accruing from fine particle size in subsequent reduction processes.

The mean size of the particles of coal should be no greater than the mean size of the particles of ore. For effective mixing it is desirable that the particles of coal be substantially all less than ¼″ in size with a great preponderance of the particles of such size that they will pass through a 20 mesh screen.

The mixture of coal and ore may be heated to a temperature between 800 and 1000° F. When the coal reaches a temperature of about 750 to 850° F. it gives off volatile matter—gas and tar vapor—and softens and becomes sticky. With the coal residue in that condition the ore particles are picked up by the residue and are impregnated or coated thereby. The particles of ore may be wholly embedded in the residue.

The coal residue which is the carbonaceous material adherently connected to the ore particles will be known as low temperature coke if the treating temperature is not substantially above 1000° F., as high temperature coke if the treating temperature is above about 1800° F. and as medium temperature coke if the treating temperature is between about 1000° F. and about 1800° F. While I may employ higher temperatures I find it normally desirable for the obtaining of optimum results to use a treating temperature not substantially higher than about 1000° F., as when that is done the carbonaceous material adherently connected to the ore particles is highly reactive and hence well suited for a metallurgical reduction operation.

In general the smaller the size of the ore particles and hence the greater the surface area of the ore in proportion to its weight the greater is the percentage of carbonaceous material required in the mixture. The range of carbon content necessary in practice for reduction of various oxides is about 12–25% in the prepared product. When my process is employed the lower limit of carbon is dictated only by the metallurgical requirements of the subsequent reduction process.

I have found that when a coal having the plastic property of coal from the Pittsburgh seam as mined in Western Pennsylvania is used at least about fifteen to twenty parts by weight of coal to eighty parts by weight of ore of ¼″ top size should be employed while twenty-five parts by weight of coal may be used with seventy-five parts by weight of ore of such size that it will pass through a 200 mesh screen. With these relative quantities the carbon content of the product ranges from 12% to 25%. The ratio of carbonaceous material to ore should never substantially exceed about 1:3 by weight as with a higher ratio of carbonaceous material to ore the product will tend to agglomerate into masses of undesirably large size not suited for metallurgical reduction processes in a fluid bed or otherwise as a flowable mass.

The apparatus which may be employed for carrying out my process may take various forms. I desirably employ an elongated rotatable cylindrical retort whose axis is either horizontal or slightly inclined to the horizontal. In its simplest form the retort is externally heated. The mixed carbonaceous material and ore is introduced into the retort where it is disposed in what I term an agitating zone and at least the carbonaceous material is heated in the retort during rotation of the retort until the desired final treating temperature of the carbonaceous material is attained, after which the mixture is withdrawn. The treatment may be continuous or in batches; continuous treatment is generally somewhat more economical than batch treatment.

Mixing of the ore and carbonaceous material before treatment in the retort is important because there is normally a considerable difference between the specific gravities of the two components. For example, the coal may weigh from forty to fifty pounds per cubic foot while the ore may weigh from one hundred to one hundred fifty pounds per cubic foot. Unless care is taken to maintain the coal and ore mixed the heavy ore may separate from the lighter coal. Rapid rotation of the retort, for instance at a peripheral speed of about one hundred feet per minute or more, and the provision of plates or obstructions spaced axially along the inner surface of the retort which will lift and stir the loose material as the retort rotates will largely overcome segregation of the ore and coal. This is true even in a batch operation.

The preferred operation is continuous. Desirably the ore is preheated before it is mixed with the carbonaceous material or admitted to the retort. The ore may supply heat for raising the temperature of the carbonaceous material to its softening point promptly after it is contacted by the ore and before segregation can take place. I desirably bring the heated ore and carbonaceous material separately to the intake end of the retort, which is the upper end if the retort is inclined to the horizontal, and there discharge both the ore and the carbonaceous material into a short common mixing screw conveyor which admixes the components and discharges the mixture into the retort. For example, if the ratio of ore to coal to be charged is 3:1 by weight and the ore has been preheated to 1000° F., the quantity of heat in three parts of ore will more than equal the heat required to raise the temperature of one part of coal from atmospheric temperature to 800° F. When the ore and coal are closely associated as in the mixing screw conveyor the heat exchange is sufficiently rapid to raise the temperature of some of the coal particles from 70° F. to the softening point of the coal, which may be in the neighborhood of 800° F., even though the average temperature of the mixture has been increased by the sensible heat of the ore to less than 800° F. To prevent the mixture from becoming sufficiently plastic to plug the feed screw I preferably insure passage of the mixture through the feed screw and into the retort in a time not substantially greater than one minute. Preferably I reduce the time to from fifteen to thirty seconds. Thus the components are maintained in active motion until they are discharged into the retort and do not act together as a large solid mass.

When the quality of the coal permits I prefer to preheat the coal as well as the ore. A coal with a long plastic and fluid range can be preheated to temperatures below its softening point, for instance, not over 600–650° F., with advantage. The advantage is that the ore particles are more rapidly picked up and the ultimate average temperature of the mixture is attained sooner after the materials reach the mixing screw whereby the thermal efficiency of the process is increased and the effective capacity of the retort is also in effect increased.

Normally additional heat is supplied in the retort, as by conduction through the shell of the retort. I prefer to maintain the shell of the retort at a temperature in the range 900–950° F. which should result in the material within the retort being at a temperature of at least about 850° F. I find that the residence time of the mixture in the retort should be not substantially longer than about ten minutes. The product is in granular form, i. e., made up of particles of ore and carbon adherently connected, the carbon normally largely or entirely coating the particles of the ore, whereby a flowable mass of fine solids is produced in which the solids are largely below ¼" to ⅜" in size and suitable for reduction in a fluid bed or otherwise as may be desired.

The apparatus shown diagrammatically in the drawing is simply an example of apparatus which I may employ. The ore is supplied from a bin 2 through a controlled feeder 3 into a preheating kiln 4 having a refractory lining 5. The preheating kiln 4 may be suitably mounted on trunnions and driven by any suitable source of power. Heat may be introduced by a burner introduced through one end of the kiln 4 as at 6, the waste gases being discharged at 7. The ore preheated in the kiln 4 is discharged through a conduit 8 and thence passes through a controlled feeder 9 and a conduit 10 into a mixing and feeding screw conveyor 11.

Coal is supplied from a bin 12 and passes through a preheater 13 which may be of any desired construction, the preheated coal being introduced into the conveyor 11 through a conduit 14. The conveyor 11 comprises a casing 15 and a screw 16 mounted on a shaft 17 driven by any suitable driving mechanism, not shown, so that the preheated coal and ore are mixed in the conveyor and impelled by the conveyor into the retort.

The retort as shown comprises a generally cylindrical drum 18 with generally conical ends mounted for rotation with its axis horizontal. The drum carries tires 19 rotatable on trunnions 20. The drum may be driven by any suitable source of power. If external heat is to be applied the drum may be heated externally by gas from a furnace indicated diagrammatically at 21. The gas heats the outside of the drum, the heat being conducted through the metal of the drum. The drum is surrounded by a stationary shell 22 for confining the heating gases. The product is discharged from the drum through a passage 23. The heating gases after heating the drum may be used for preheating the coal. Numerous changes and modifications of the apparatus may be made.

I shall describe one way in which the product of my invention may be utilized. It may be employed in the reduction of titanium oxide ore to titanium tetrachloride.

In the present state of the art of recovering titanium as a metal from its ores the intermediate step of obtaining the titanium as titanium tetrachloride is very important. That is the way in which the titanium is separated from other elements with which it is associated in natural ores, particularly from oxygen and iron. The oxides of titanium, whether or not associated with oxides of iron or other elements, when heated with carbon and in the presence of chlorine gas are reduced by the carbon and titanium tetrachloride is formed. Iron combines with chlorine to form a chloride gas but such gas is easily separated from the titanium tetrachloride by well known purifying methods. Other elements also are chlorinated and pass out in gaseous form, including carbon and hydrogen. However, in practice the materials employed are predetermined so as to limit the quantites of elements other than titanium, particularly carbon and hydrogen, that form chloride gases.

The reactions described are obtained in industry in both fixed bed and fluid bed reactors but in either it is highly desirable to have the titanium ore reduced to fine particle size and to have the carbon by which the oxide is to be reduced intimately associated with the ore particles.

For processing in a fixed bed reactor the materials charged to the reactor should, as above explained, be of such size that the bed is permeable to the flow of gas with the individual pieces somewhat porous so that the chlorine gas may attack the titanium. For processing in the fluid bed the particle size must be small, preferably not substantially greater than about ⅜". The usual charge material for the fluid bed reactor is a mechanical mixture of ore and carbon particles.

There have been developed several ways of preparing the titanium ores for reaction with carbon and chlorine in the fixed bed such as by mixing the ore with coking coal or other carbonaceous material and heating the mixture to devolatilize the coal, thereby making a firm cinder or more or less massive material, by briquetting the ore and carbon, subsequently calcining the briquets, or by otherwise making an agglomerate of the ore and carbon. Such cinder, briquets or agglomerates have then been pulverized to a suitable fineness for charging to the fluid reactor. Thus a two-stage operation has been employed. By my process I provide an improved charge material for a fluid bed reactor by a relatively inexpensive one-stage operation.

The product of my process may also be used in the electric furnace. Heretofore electric furnace operation has been limited to coarse materials. With buried electrodes an open permeable charge is essential to allow the free escape of the large volume of gases produced. However, with electrodes which are not buried when the charge is heated by an arc on or just above the top of the charge it is possible to supply the charge in finely divided condition, the charge preferably being fed continuously on top of the molten bath. The product of my process is ideally suited to such use.

The product may also, if desired, be briquetted by use of a suitable binder to render it adaptable for use in a fixed bed reactor where a comparatively low percentage of carbon is desired.

The coal or other carbonaceous material which I employ will ordinarily not be completely devolatilized at the temperatures which I prefer to employ. A coal with 35% volatile matter content treated at not over about 950° F. will retain perhaps 15% volatile matter. Should such a percentage of volatile matter be undesirable in the use to which the product is to be put a higher temperature may be employed in the reactor. I have calcined the material in a rotary internally fired kiln. It may also be calcined in a fluid retort.

This application is in part a continuation of my co-pending application Serial No. 244,852, filed September 1, 1951, now abandoned.

While I have described certain present preferred methods of practicing the invention it is to be distinctly understood that the invention is not limited thereto but may be otherwise variously practiced within the scope of the following claims.

I claim:

1. A process of making a flowable mass of fine discrete solids largely made up of particles of carbonaceous material and particles of material which is predominantly ore adherently connected together comprising preheating finely divided material which is predominantly ore to a temperature above the softening temperature of the hereinafter mentioned finely divided coking carbonaceous material in solid form, admixing in a mixer the preheated material which is predominantly ore and finely divided coking carbonaceous material in solid form, completing the admixing in the mixer before the finely divided carbonaceous material exceeds a temperature of about 600°–650° F. and maintaining the same admixed as the temperature rises until the temperature of the carbonaceous material approaches its softening temperature, then discharging the mixture from the mixer into a rotating retort wherein the mixture is agitated and adding further heat to the mixture through the wall of the retort so that the carbonaceous material softens and becomes sticky while in intimate contact with the finely divided material which is predominantly ore, obviating any tendency of the respective materials to segregate during agitation because of a difference in specific gravity, the agitation causing particles of the carbonaceous material and particles of the material which is predominantly ore to become adherently connected together as fine solids forming a flowable mass, and continuing the heating and agitation of the mixture until the mixture attains a temperature of at least 850° F. but not substantially higher than 1000° F. and the carbonaceous material returns to solid form.

2. A process of making a flowable mass of fine discrete solids largely made up of particles of carbonaceous material and particles of material which is predominantly ore adherently connected together comprising preheating finely divided material which is predominantly ore to a temperature above the softening temperature of the hereinafter mentioned finely divided coking carbonaceous material in solid form, preheating finely divided coking carbonaceous material in solid form to a temperature approaching but below the softening temperature of the carbonaceous material, admixing in a mixer the preheated material which is predominantly ore and the preheated finely divided coking carbonaceous material in solid form, completing the admixing in the mixer before the finely divided carbonaceous material exceeds a temperature of about 600°–650° F. and maintaining the same admixed as the temperature rises until the temperature of the carbonaceous material approaches its softening temperature, then discharging the mixture from the mixer into a rotating retort wherein the mixture is agitated and adding further heat to the mixture through the wall of the retort so that the carbonaceous material softens and becomes sticky while in intimate contact with the finely divided material which is predominantly ore, obviating any tendency of the respective materials to segregate during agitation because of a difference in specific gravity, the agitation causing particles of the carbonaceous material and particles of the material which is predominantly ore to become adherently connected together as fine solids forming a flowable mass, and continuing the heating and agitation of the mixture until the mixture attains a temperature of at least 850° F. but not substantially higher than 1000° F. and the carbonaceous material returns to solid form.

3. A process of making a flowable mass of fine discrete solids largely made up of particles of carbonaceous material and particles of material which is predominantly ore adherently connected together comprising preheating finely divided material which is predominantly ore to a temperature of the order of at least 900° F., preheating finely divided coking carbonaceous material in solid form to a temperature of the order of 400°–700° F., admixing in a mixer the preheated material which is predominantly ore and the preheated finely divided coking carbonaceous material in solid form, completing the admixing in the mixer before the finely divided carbonaceous material exceeds a temperature of about 600°–650° F. and maintaining the same admixed as the temperature rises until the temperature of the carbonaceous material approaches its softening temperature, then discharging the mixture from the mixer into a rotating retort wherein the mixture is agitated and adding further heat to the mixture through the wall of the retort so that the carbonaceous material softens and becomes sticky while in intimate contact with the finely divided material which is predominantly ore, obviating any tendency of the respective materials to segregate during agitation because of a difference in specific gravity, the agitation causing particles of the carbonaceous material and particles of the material which is predominantly ore to become adherently connected together as fine solids forming a flowable mass, and continuing the heating and agitation of the mixture until the mixture attains a temperature of at least 850° F. but not substantially higher than 1000° F. and the carbonaceous material returns to solid form.

4. A process of making a flowable mass of fine discrete solids largely made up of particles of carbonaceous material and particles of material which is predominantly ore adherently connected together comprising preheating finely divided material which is predominantly ore and which is predominantly not substantially greater than ⅜ inch in size to a temperature above the softening temperature of the hereinafter mentioned finely divided coking carbonaceous material in solid form, admixing in a mixer the preheated material which is predominantly ore and finely divided coking carbonaceous material in solid form, completing the admixing in the mixer before the finely divided carbonaceous material exceeds a temperature of about 600°–650° F. and maintaining the same admixed as the temperature rises until the temperature of the carbonaceous material approaches its softening temperature, then discharging the mixture from the mixer into a rotating retort wherein the mixture is agitated and adding further heat to the mixture through the wall of the retort so that the carbonaceous material softens and becomes sticky while in intimate contact with the finely divided material which is predominantly ore, obviating any tendency of the respective materials to segregate during agitation because of a difference in specific gravity, the agitation causing particles of the carbonaceous material and particles of the material which is predominantly ore to become adherently connected together as fine solids forming a flowable mass, and continuing the heating and agitation of the mixture until the mixture attains a temperature of at least 850° F. but not substantially higher than 1000° F. and the carbonaceous material returns to solid form.

5. A process of making a flowable mass of fine discrete solids largely made up of particles of carbonaceous material and particles of material which is predominantly ore adherently connected together comprising preheating finely divided material which is predominantly ore and which is predominantly not substantially greater than ⅜ inch in size to a temperature of the order of at least 900° F., preheating finely divided coking carbonaceous material in solid form and which is predominantly not substantially greater than ⅜ inch in size to a temperature of the order of 400°–700° F., admixing in a mixer the preheated material which is predominantly ore and the preheated finely divided coking carbonaceous material in solid form, completing the admixing in the mixer before the finely divided carbonaceous material exceeds a temperature of about 600°–650° F. and maintaining the same admixed as the temperature rises until the temperature of the carbonaceous material approaches its softening temperature, then discharging the mixture from the mixer into a rotating retort wherein the mixture is agitated and adding further heat to the mixture through the wall of the retort so that the carbonaceous material softens and becomes sticky while in intimate contact with the finely divided material which is predominantly ore, obviating any tendency of the respective materials to segregate during agitation because of a difference in specific gravity, the agitation causing particles of the carbonaceous material and particles of the material which is predominantly ore to become adherently connected together as fine solids forming a flowable mass, and continuing the heating and agitation of the mixture until the mixture attains a temperature of at least 850° F. but not substantially higher than about 1000° F. and the carbonaceous material returns to solid form.

References Cited in the file of this patent

UNITED STATES PATENTS

| | | |
|---|---|---|
| 1,711,153 | McIntire | Apr. 30, 1929 |
| 1,941,983 | Gudmundsen | Mar. 21, 1932 |
| 2,000,305 | Thomsen | May 7, 1935 |
| 2,029,309 | Curtis et al. | Feb. 4, 1936 |
| 2,253,470 | Muskat et al. | Aug. 19, 1941 |
| 2,288,613 | Dill | July 7, 1942 |
| 2,296,522 | Hartley | Sept. 22, 1942 |
| 2,399,096 | Byrns | Apr. 23, 1946 |
| 2,477,412 | Lohse | July 26, 1949 |
| 2,508,878 | Yates et al. | May 23, 1950 |
| 2,558,613 | Fourmanoit | June 26, 1951 |